Jan. 14, 1930.  W. W. TANTLINGER  1,743,580
FRUIT PICKER
Filed Sept. 22, 1928   3 Sheets-Sheet 2
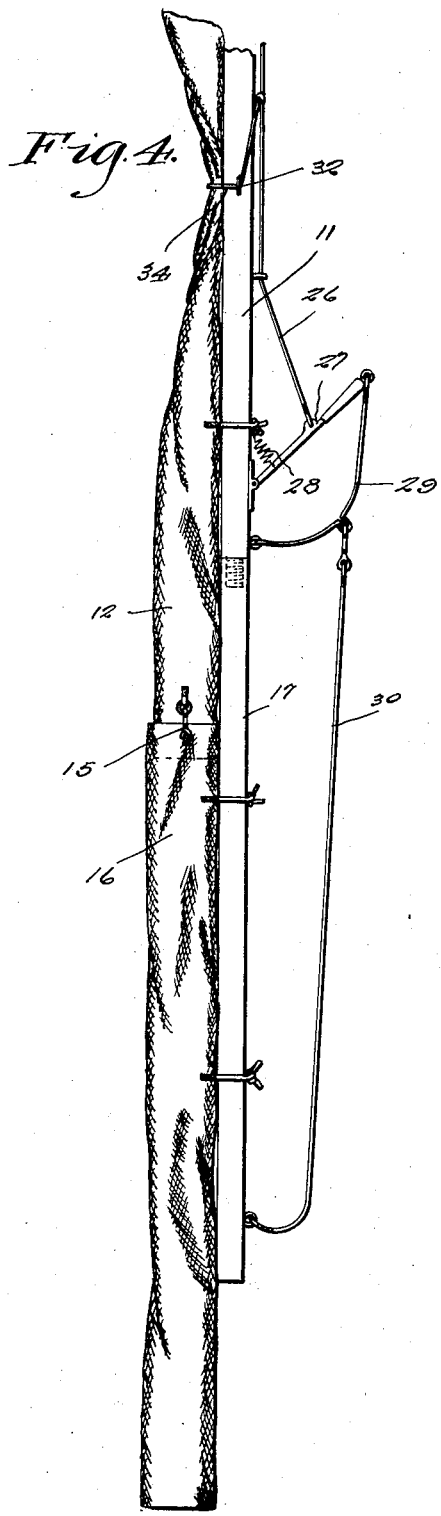
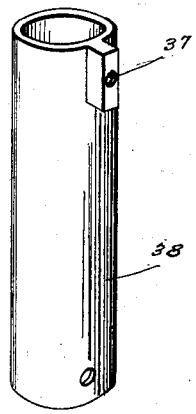
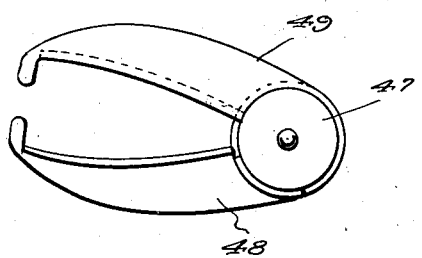
Inventor
Walter W. Tantlinger
By Clarence A. O'Brien
Attorney

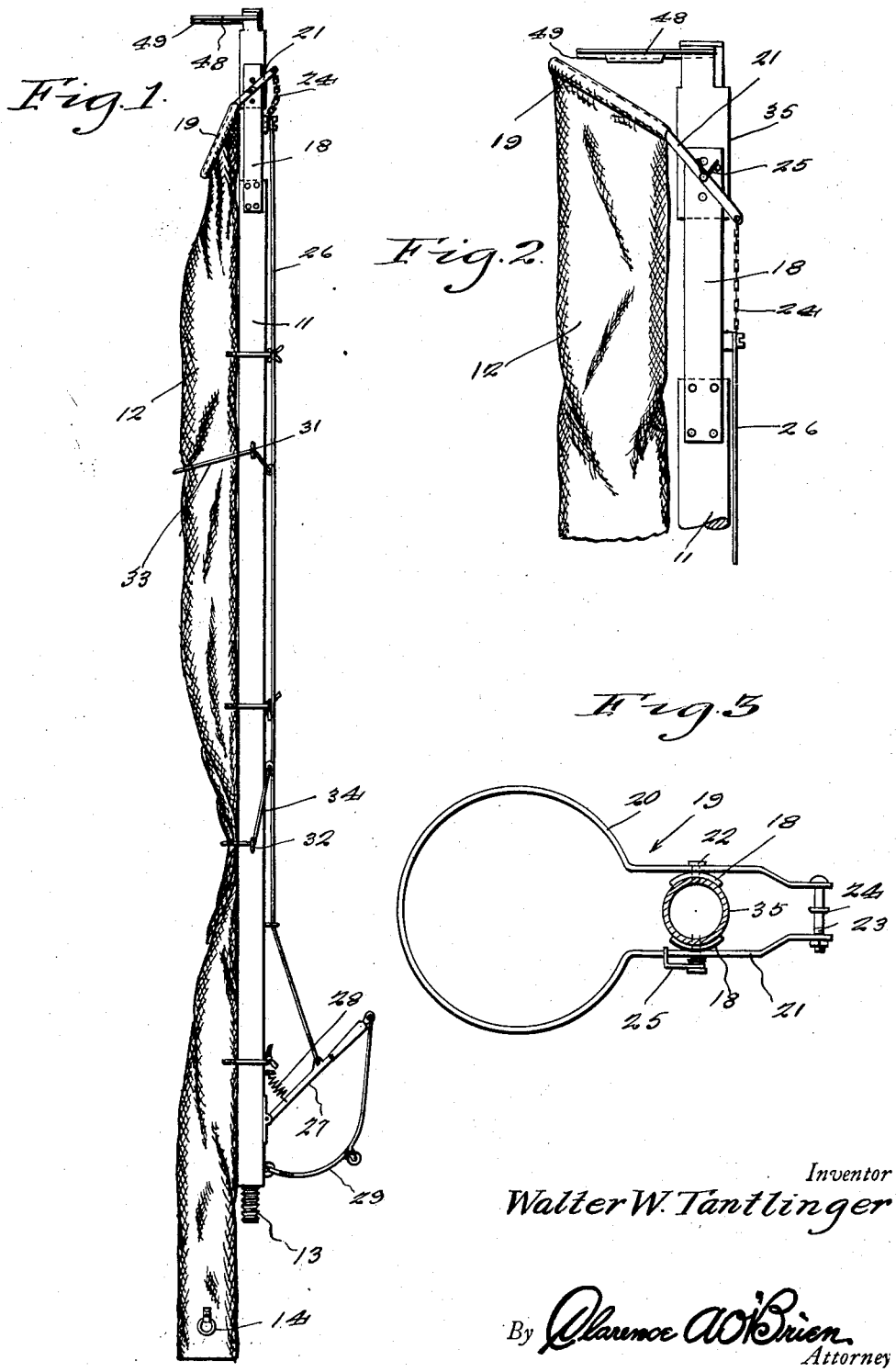

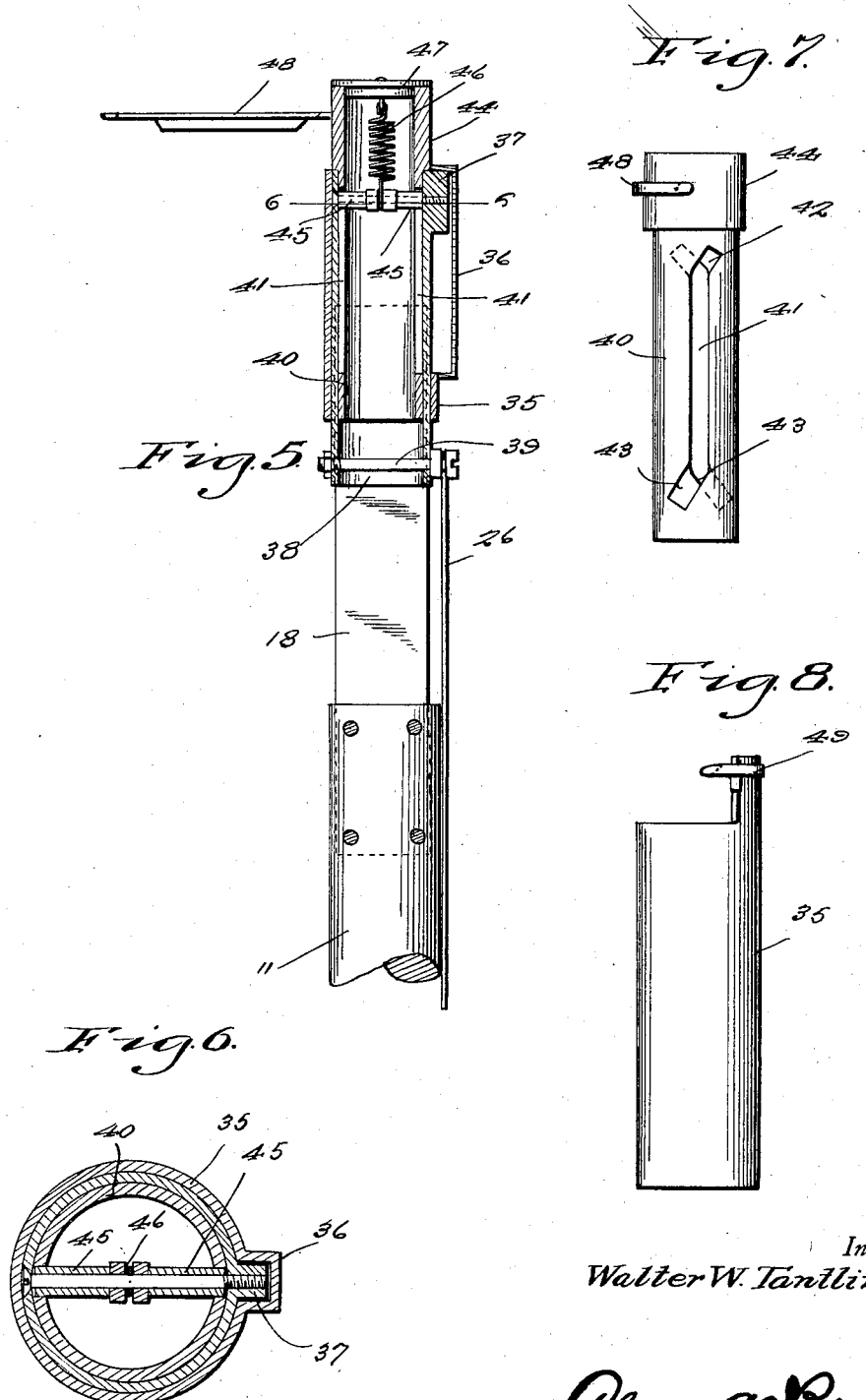

Patented Jan. 14, 1930

1,743,580

UNITED STATES PATENT OFFICE

WALTER W. TANTLINGER, OF SANTA ANA, CALIFORNIA

FRUIT PICKER

Application filed September 22, 1928. Serial No. 307,624.

This invention relates to an improved fruit picker, that is a mechanical contrivance or device for gathering fruit from trees, and it is characterized by certain safe and sound features, in that it provides for safety in picking, for the operator, and permits the fruit to be gathered in a sound or firm condition.

The invention has more particular reference to that class of fruit gatherers or pickers characterized by a relatively long staff or pole, having fruit stem severing means at its top and carrying an elongated sack cooperating with the severing means and serving to provide a conduit for delivering the fruit in a sound condition to a collection receptacle or sack therebeneath.

The invention is therefore especially useful and adapted for picking fruit from large and small trees, and especially for instance, avocados.

Obviously, the principal object of the invention is to avoid climbing up on high ladders, and yet enabling the operator to pick the fruit with the same care and accuracy and with much more ease and safety to himself than by the hand process. Also protecting trees from being broken by weight of ladder and man.

There are numerous mechanical improvements in this arrangement, which provide for features to be especially detailed as the description proceeds.

In the drawings:

Figure 1 is a side elevational view of a fruit picker or gatherer device constructed in accordance with the present invention, showing the upper sections thereof.

Figure 2 is a fragmentary view of the upper portion of the structure showing the manner in which the mouth of the elongated sack-like conduit is raised up and underneath the fruit severing means.

Figure 3 is a view showing the construction of the device, for raising and lowering the mouth of the sack.

Figure 4 is a view like Figure 1, showing an attaching device for the lower portion of the structure for increasing the length of the complete device.

Figure 5 is a view in section and elevation, detailing construction of the operating means for the fruit stem severing knives.

Figure 6 is an enlarged cross sectional view through this structure taken approximately on the plane of the line 6—6 of Figure 5.

Figure 7 is an elevational view of one of the parts of the operating device just referred to.

Figure 8 is a similar view of a complemental part.

Figure 9 is a perspective view of the remaining part.

Figure 10 is a top plan view of the fruit stem severing knives.

Referring now in detail to the drawings, and considering particularly Figure 1, it will be observed that the reference character 11 designates the main pole section of the staff or handle. This carries an open ended sack like conduit or chute 12, through which the fruit passes downwardly. The lower end of this extends below a screw threaded connection 13 on the lower end of the pole section 11 where it is provided with rings 14, to permit clips 15 on an extension or lower section 16 of the conduit to be connected thereto as shown in Figure 4. Also as shown in the last figure, the lower extension section 17 of the handle is connected to the upper section 11. This permits the device to be adjusted to the desired depth or height as the case may be. Obviously, additional sections may be included in practice if conditions require it.

Fastened to the upper end of the handle section 11, we find a pair of metal straps or strips 18 disposed in spaced parallelism. Pivotally mounted on these strips 18 as shown in Figure 3 is an operating device 19 for the mouth or upper end of the sack like chute.

This device comprises a ring like element with which the sack is connected, and arms 21 pivotally connected at 22, with the strip, extending beyond the strip and carrying a small bolt 23, with which an operating chain 24 is connected. A spring 25 is provided here for normally maintaining the device in the position shown in Figure 1. The chain, which is normally slack, is actuated through the medium of a pull cable 26, which extends down along the handle and is connected to an operating lever 27, within convenient reach of the operator. A coil spring 28 is connected with this lever and serves to hold it in the position shown in Figure 1. Also the lever carries a bail 29 for connection of an extension cable 30 as shown in Figure 4.

At this time, I would direct attention to upper and lower eye bolts 31, and 32, mounted on the handle. Passing through these eyes are cords 33 and 34, respectively. These cords embrace the sacks in an alternating fashion, in order to compress the sacks to divide it into sections.

The purpose of this arrangement is to allow the fruit to drop down through the chute, in a sort of step-by-step manner. Thus, we have conduit contracting elements for dividing the conduit into sections to insure proper descent of the fruit to prevent damage and to insure that the fruit will remain sound and that one article of fruit will not drop down on the other or bruise it. This is a highly important feature of the invention.

Attention is now invited more particularly to the fruit stem cutting or severing means and the operating means thereof. This structure is detailed particularly in Figures 5 and 10 inclusive. Referring to these figures and particularly to Figure 5, at this time, it will be seen that 35 designates an outer open ended cylinder, which is rigidly fastened between the strips 18. This is provided with a vertical outstanding keyway or guide 36, which slidably accommodates a key 37, on a longitudinally slidable sleeve 38, fitting within the cylinder. This sleeve has a bolt 39 fastened to its lower end with which the pull cable 26 is connected. Disposed within the sleeve 38 is an inner rotary sleeve 40, having diametrically opposite elongated slots 41, having offset portions 42 and 43 at their opposite ends as shown in detail in Figure 7. The upper end 44 of this sleeve is enlarged to provide a shoulder which rests rotatably upon the stationary cylinder. These slots may be generally designated as cam slots. Extending through the cam slots are rollers 45, carried by the slidable sleeve 38. A spring 46 is attached to these and to a closing cap 47 on the upper end of the inner cylinder.

It will be noted that the enlarged portion 44 of the rotary sleeve carries the longitudinally curved relatively movable cutting blade 48, which cooperates with a complemental blade 49 on the stationary cylinder 35.

There is a peculiarly intermittent or step by step operation of the cutting blade, insured with this arrangement. For example, the cam rollers on the longitudinally slidable sleeve 38 are normally stationed in the upper offset ends 42 of the cam slot. Hence when the cable 26 is pulled down through the medium of proper manipulation of the lever 27, a partial rotation is imparted to the rotary inner sleeve 38. This brings the point of the movable blade 48 into engagement with the corresponding point 49 of the stationary blade. It does not, however, bring the blades into relation for stem severing. The succeeding movement of the cable 26 does not produce an immediate rotation of the sleeve 40. However, the sleeve remains substantially stationary at this time, while the sleeve 38 is travelling downwardly. During this intermediate downward travel of the sleeve 38, the aforesaid chain 24, which is normally slack, is rendered taut. Then a pull is exerted upon the operating device 19 for the mouth of the sack and the sack is raised up from the lower position shown in Figure 1, to the raised position shown in Figure 2. As the cable continues to move downwardly and the cam rollers move into the laterally offset lower end portion 43 of the cam slot, the final rotation is imparted to the inner rotary sleeve, thus bringing the knives 48 and 49 into stem severing position. The fruit is then cut and allowed to drop down into the upper portion of the sack. At this time, the cord 33 is tightened around the sack, whereas the cord 34 is loose. When, however, the parts are allowed to resume their normal position for the next cutting operation, the cord 33 releases the fruit pocketed in the upper portion of the conduit and allows it to drop down into the second conduit portion. In this manner, the fruit is allowed to pass downwardly through the conduit in a step by step manner to prevent bruising. Obviously, the construction of parts is such as to bring about the proper timed action desirable in intermittent operation.

From the foregoing description and drawings it will be seen that the gist of my invention is based upon the novel structural arrangement, whereby the lateral cutting knives are actuated in a step by step manner through the movement of the relatively movable cylindrical parts of the operating device, anti-friction cam rollers and peculiarly constructed cam slots.

Thus the knives are held stationary around the stem of the fruit (without severing it) so that the fruit cannot escape. During this time the position of the device may be adjusted to dispose the mouth of the sack so that it may be raised around the fruit without interference from limbs or props. This successive arrangement together with the means for alternately closing portions of the conduit sack, insures the production of a device, which will well serve the purposes for which it is in well serve the purposes for which it is intended in an efficient and dependable manner.

It is thought, however, that by considering the description in connection with the drawings, a clear understanding of the construction, operation, and features of the invention will be had. Therefore, a more lengthy description is regarded unnecessary.

Minor changes in the shape, size and rearrangement of parts may be resorted to, in actual practice, without departing from the spirit of the invention or the scope of the appended claims.

I claim:

1. In a fruit picker of the class described, in combination, an elongated handle, a sack like fruit delivery conduit mounted on said handle, fruit stem severing means mounted on the upper end of the handle above the intake mouth of said conduit, said severing means embodying a relatively stationary knife and a relatively movable knife, the mouth of said sack being normally disposed in a position spaced downwardly from said knives to render the knives clearly visible, and means for operating said knives in an intermittent manner and for moving the mouth of said conduit into close proximity beneath the knives, when the knives are in a predetermined relationship.

2. In a fruit picker of the class described, a handle, a sack like fruit delivery conduit mounted on said handle, a raising and lowering device pivoted on the handle and connected with the intake mouth of said conduit, fruit severing knives pivoted on the handle above the intake mouth of the conduit, one knife being stationary and the other knife relatively movable, actuating means for producing an intermittent operation of said knives, an operating lever pivoted on the handle within convenient reach of the operator of the device, a pull wire connected with said lever and with said operating means, and a normally slack chain connected with said operating means and with the pivotally mounted raising and lowering device.

3. In a fruit picker of the class described, a handle, a sack like fruit delivery conduit mounted on said handle, a raising and lowering device pivoted on the handle and connected with the intake mouth of said conduit, fruit severing knives pivoted on the handle above the intake mouth of the conduit, one knife being stationary and the other knife relatively movable, actuating means for producing an intermittent operation of said knives, an operating lever pivoted on the handle within convenient reach of the operator of the device, a pull wire connected with said lever and with said operating means, and a normally slack chain connected with said operating means and with the pivotally mounted raising and lowering device, together with conduit embracing means for contracting the conduit, said embracing means being connected to and operated by said wire.

4. In a fruit picking device of the class described, an elongated handle, a sack like fruit delivery flexible conduit mounted on said handle, a spring returned raising and lowering device pivotally mounted on the handle and connected with the intake mouth of said conduit, fruit stem severing means on the upper end of the handle embodying right angularly disposed knives and intermittent operating means therefor, said knives including a stationary knife and a relatively movable knife, the movable knife being movable toward the stationary knife in a step by step manner, and a pivotally mounted spring return actuating lever on the handle within convenient reach of the operator, a pull wire connected with said lever and connected at its upper end with the actuating device for the severing knives, a normally slack chain connected with said means and with said pivotally mounted raising and lowering device, eye bolts mounted on said handle at longitudinally spaced points, conduit embracing points cords passing through said eye bolt and connected with said pull wire, said cord being arranged for alternately contracting said conduit and dividing it into longitudinally spaced trapping portions.

5. In a fruit picking device of the class described, a handle, a pair of spaced parallel strips rigidly mounted on the upper end of the handle, an intermittent cam actuating device mounted between the upper end of said strip, successively operable laterally disposed severing knives mounted upon said actuating device, an open ended sack like fruit delivery conduit mounted on the handle, and a raising and lowering device connected with the mouth of the sack and pivotally mounted on said strips.

6. In a fruit picking device of the class described, a handle, a stationary open ended cylinder mounted on the upper end of the handle and provided with a keyway, a slidable sleeve in said cylinder having a key sliding in said keyway, cams riding in said rollers carried by said slidable sleeve, manual operating means for said sleeves mounted on said handle, an inner cam slot sleeve disposed within said slidable sleeve and rotatable with respect thereto and cooperable with said rollers, a relatively movable knife carried by the inner rotary sleeve, and a relatively stationary knife carried by said cylinder.

In testimony whereof I affix my signature.

WALTER W. TANTLINGER.